Jan. 18, 1949.  A. C. COUTANT ET AL  2,459,626
TRIPOD HEAD WITH A REMOVABLE CAMERA SUPPORT
Filed March 8, 1947  4 Sheets-Sheet 1

INVENTORS
Andre Clement Coutant
Jacques Mathot
By Robert E. Burns
ATTORNEY

Patented Jan. 18, 1949

2,459,626

UNITED STATES PATENT OFFICE 2,459,626

TRIPOD HEAD WITH A REMOVABLE CAMERA SUPPORT

André Clément Coutant and Jacques Mathot, Paris, France

Application March 8, 1947, Serial No. 733,320
In France March 13, 1946

4 Claims. (Cl. 248—177)

For the taking of cinematographic pictures it is not always convenient to mount the camera on a tripod which often can scarcely if at all be erected at certain places owing to the displacements of the actors or to local difficulties.

The purpose of our invention is to remove these inconveniences by so designing the camera-supporting table that it can be detached easily from the tripod and that the camera can be used immediately thereafter by carrying same in one's arms and contingently resting it on an occasional support; moreover, the said table is provided with means enabling to secure it rigidly to a horizontal or a vertical support occurring on the spot, such as a gate, a door, etc.

This makes it possible without difficulties and time loss to follow agitated scenes and to record all their phases from standpoints at which it would be inconvenient if not wholly impossible to use a tripod.

A particular embodiment of a tripod head with a camera support according to our invention will now be described by way of example, reference being had to the appended drawing in which.

Figure 1:
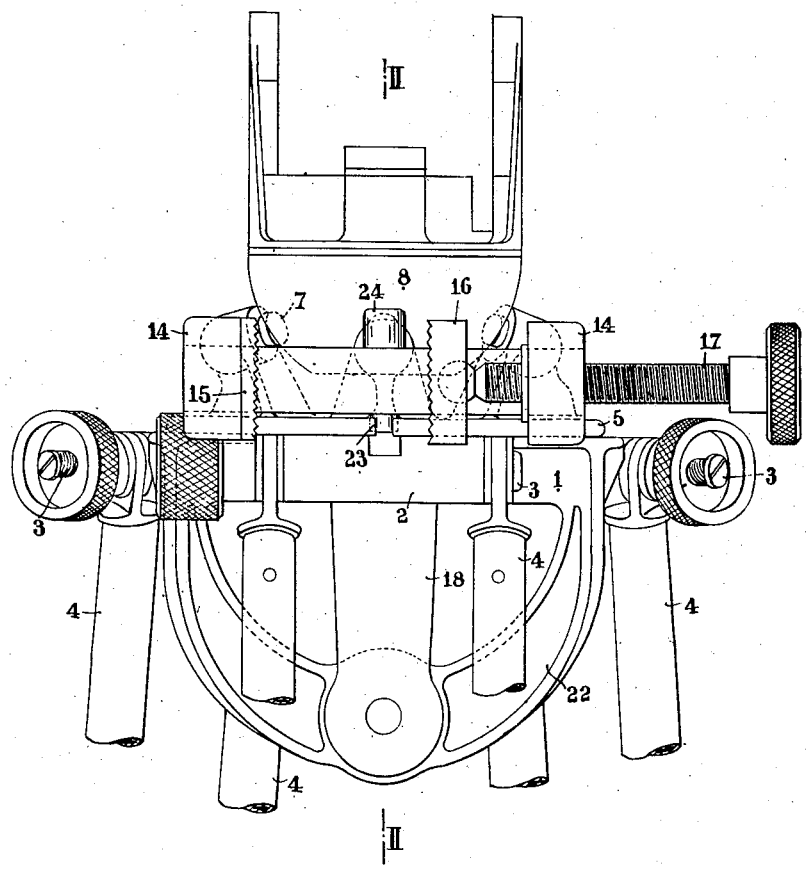
Figures 1 and 2 are a front and a side elevational view respectively of the tripod head and removable table assembly, parts of them being shown in section.
Figure 2:
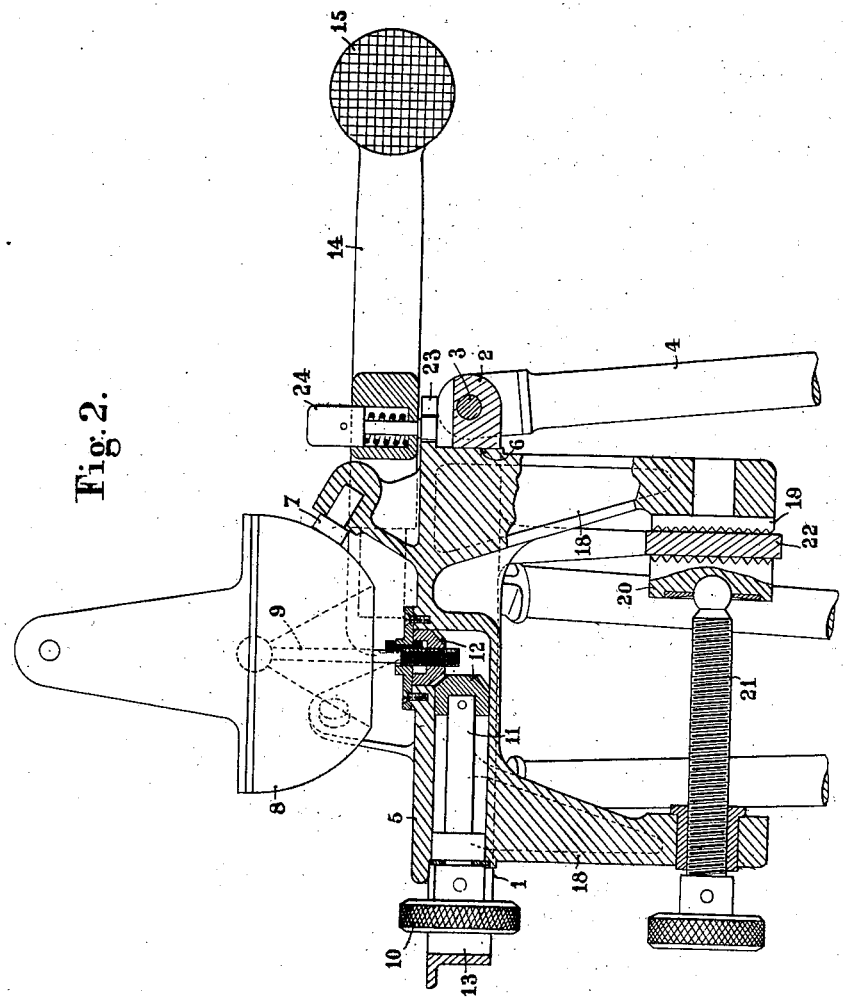
Figure 3:
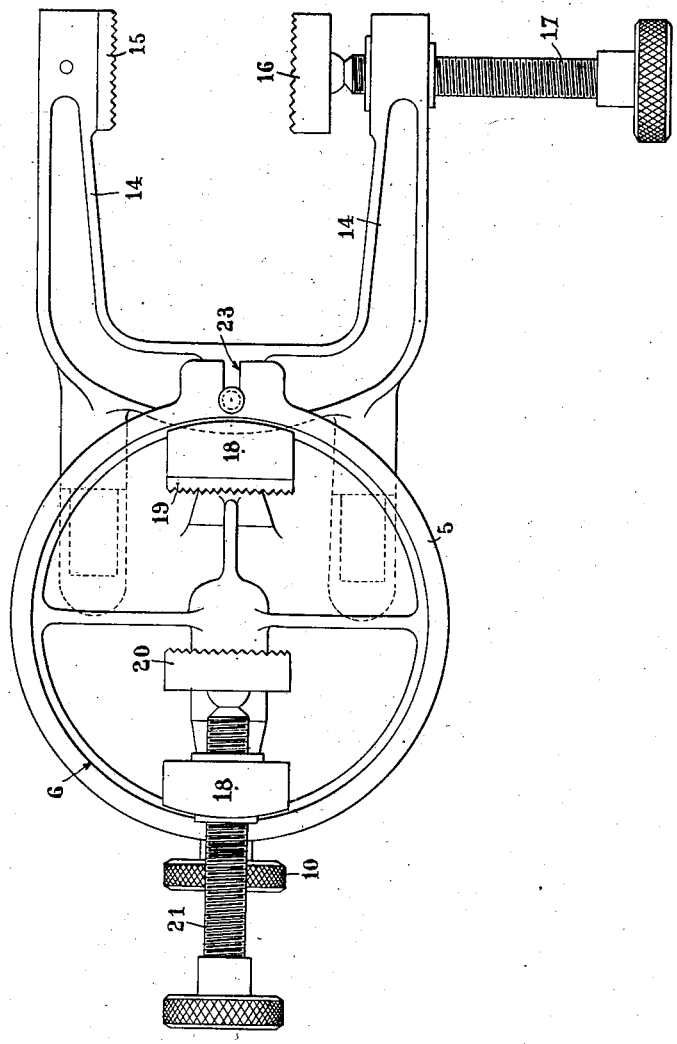
Figure 3 is a bottom plan view of the table alone.
Figure 4:
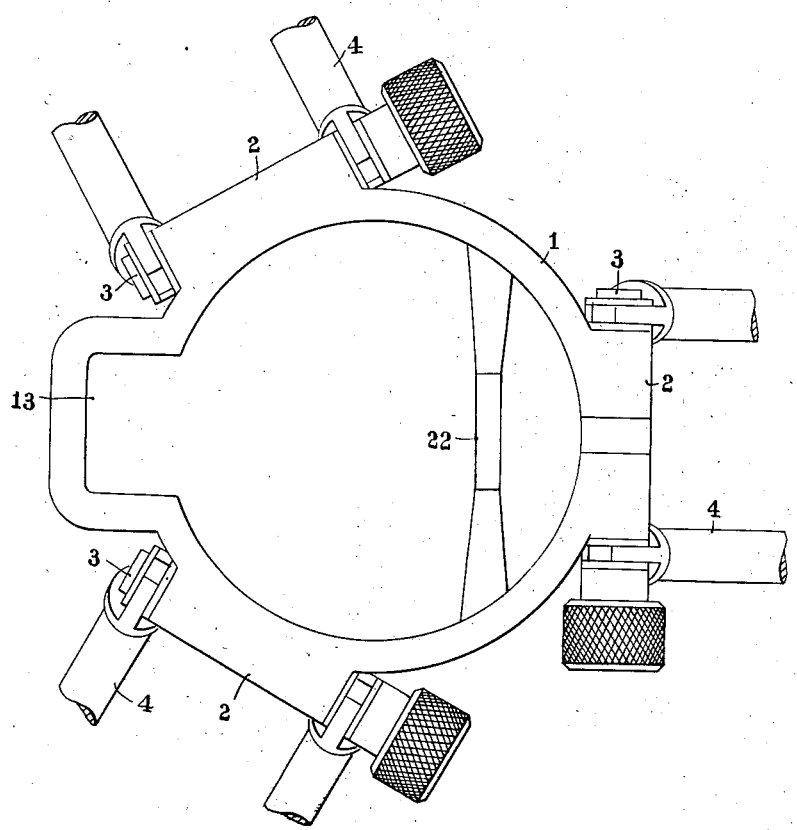
Figure 4 is a top plan view of the tripod head alone.

In this embodiment the head 1 of the tripod has an annular shape and is formed at the periphery thereof with three bosses 2 for the accommodation of the pintles 3 on which the telescopic legs 4 are hinged.

The table 5 is formed with a cylindrical portion 6 which is snugly fitted in the ring 1.

Means are provided on top of the table to support the camera through the medium of a ball-and-socket joint, for instance similar to the one described in the U. S. patent application filed on December 13, 1946, for "A tripod with a ball and socket joint," in the names of the same applicants.

7 designates three rests intended to support the ball 8, and 9 denotes a ball-headed bolt serving to press the ball 8 against its rests 7; in this embodiment the pull on the bolt 9 is exerted by means of a bevel-gear set 12 with the aid of a knob 10 keyed to a shaft 11.

A slot 13 of sufficient length is provided in the ring 1 for the accommodation of the knob 10.

The table 5 is provided with two screw clamping devices designed to secure the camera to some occasional support provided with substantially vertical surfaces; the one of said clamping devices comprises a pair of horizontal arms 14 projecting from one side of the table; one of said arms carries the fixed jaw 15 while the other jaw 16 is carried universally on the tip of a spindle 17 threaded through the other arm; the other clamping device comprises a pair of downwardly extending arms 18 one of which carries the fixed jaw 19 while the other jaw 20 is carried universally on the tip of a spindle 21 threaded through the other arm. With the aid of the last-mentioned device it is possible not only to secure the table 5 (detached from the head 1) to any suitable support, e. g. a fence, but also to lock it to the annular table 1 by clamping a cradle 22 rigid with said head between the jaws 19 and 20.

It will be appreciated that the camera-carrying table 5 can be detached and removed instantaneously from the tripod head by loosening of the screw 21 so that the camera together with the table 5 to which same is attached can be carried in one's arms or secured readily to the edge of a door leaf or to some other support that may be available depending on the local possibilities.

Likewise, the clamping device comprising the horizontal arms 14 can be detached instantaneously from the tripod head due to the provision of a slot 23 and a spring-loaded pusher 24, whereby manipulating the camera becomes still easier.

Of course, the particular arrangements concerning the telescopic legs, the means for hinging, adjusting and locking the camera may be varied without departing from the scope of the invention; likewise, the means for locking the table 5 on the ring 1 may be replaced by equivalent quickly detachable means.

What we claim as our invention and desire to secure by Letters Patent is:

1. The combination of an annular tripod head formed with three peripheral bosses for the hinging of the legs with a circular camera-supporting table adapted to rest removably on said head, means to secure a camera on said table and fastening means adapted to secure said table on occasional supports and comprising pairs of parallel arms rigid with the table and a clamping screw threaded through one arm in each pair.

2. The combination of an annular tripod head formed with three peripheral bosses for the hinging of the legs with a circular camera-supporting table adapted to rest removably on said head, means to secure a camera on said table, a pair of downwardly projecting arms rigid with the table, a screw threaded through one of said arms cooperating with the other arm to clamp some occasional support therebetween, another pair of horizontally extending arms removably secured to the table and a screw threaded through one of said arms cooperating with the other arm to clamp some occasional support therebetween.

3. The combination of an annular tripod head formed with three peripheral bosses for the hinging of the legs with a circular camera-supporting table adapted to rest removably on said head, means to secure a camera on said table, a pair of downwardly projecting arms rigid with the table, a screw threaded through one of said arms cooperating with the other arm to clamp some occasional support therebetween, another pair of horizontally extending arms removably secured to the table, a screw threaded through one of said arms cooperating with the other arm to clamp some occasional support therebetween and a downwardly extending projection on said head adapted to be clamped between one of the aforesaid downwardly projecting arms and the screw threaded through the other arm.

4. The combination of an annular tripod head formed with three peripheral bosses for the hinging of the legs with a circular camera-supporting table adapted to rest removably on said head, three upwardly extending projections provided on the table at equal angular distances about the centre thereof, a ball-headed bolt arranged in coaxial relation to the table, means to move said bolt as desired with respect to the latter for the purpose of pressing the camera support on said projections and fastening means adapted to secure said table on occasional supports and comprising pairs of parallel arms rigid with the table and a clamping screw threaded through one arm in each pair.

ANDRÉ CLÉMENT COUTANT.
JACQUES MATHOT.

REFERENCES CITED

The following references are of record in the file of this patent:

UNITED STATES PATENTS

| Number | Name | Date |
|---|---|---|
| 1,166,018 | Soresi | Dec. 28, 1915 |